Jan. 4, 1966
W. W. MOUNT
3,227,199
SELF-LOCKING THREADED FASTENERS HAVING
UNINTERRUPTED THREADS WITH A PITCH
DEVIATION THEREIN
Filed Aug. 13, 1962
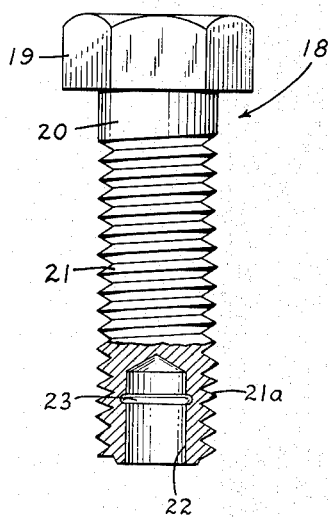
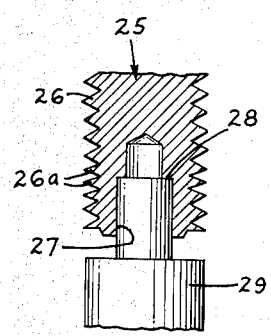
INVENTOR
WADSWORTH W. MOUNT
BY
HIS ATTORNEYS

United States Patent Office 3,227,199
Patented Jan. 4, 1966

3,227,199
SELF-LOCKING THREADED FASTENERS HAVING UNINTERRUPTED THREADS WITH A PITCH DEVIATION THEREIN
Wadsworth W. Mount, Warren Township, Somerset County, N.J., assignor, by mesne assignments, to United Shoe Machinery Corporation, Boston, Mass., a corporation of New Jersey
Filed Aug. 13, 1962, Ser. No. 216,468
2 Claims. (Cl. 151—14)

This invention relates to improvements in self-locking fastening devices and it relates particularly to improved bolts, screws and the like having self-contained locking portions rendering the fastening devices self-locking throughout a wide range of temperatures.

Lock nuts have been made heretofore in which two interconnected axially aligned sections of the nut are provided with separate threads of the same pitch for receiving a bolt or screw. In order to render the nut self-locking, the portions are displaced relatively a small amount axially so that the threads therein are somewhat off-set from their normal pitch relation with the result that when a bolt or screw enters the two threaded sections, a jamming action occurs which holds the nut tightly on the screw. While such nuts initially have a substantial locking torque, the normal tendency of the screw to spring the two sets of threads apart tends to restore the threads to their original aligned condition thereby reducing very substantially the locking torque of the nut. Moreover, inasmuch as the thread in the nut is discontinuous, i.e., is in two separate sections, either the nut must be somewhat oversize in length in order to provide the necessary tensile strength or the nut is considerably weaker than a conventional nut of the same dimensions. Also the sharp edge of the thread on the displaced portion which the screw or bolt enters last, being misaligned, frequently is bent and broken thereby leaving a cutting edge which cuts and galls the thread of the screw or bolt.

It has been proposed also heretofore to provide bolts or screws in which a portion of the thread is expanded radially in order to render the device self-locking. Such screws or bolts initially have a strong locking torque but they have the disadvantage of galling and wearing away of part of the thread thereof with the result that the locking torque is greatly reduced upon reuse.

In accordance with the present invention, modified self-locking male threaded fasteners are provided which are characterized by a continuous thread having a plurality of turns and in which at least a portion of at least one turn of the thread has a different pitch than the other turns of the thread adjacent thereto.

More particularly in accordance with the present invention, male threaded fasteners, such as bolts, screws, turnbuckles and the like are initially provided with a continuous thread of uniform pitch and thereafter the pitch of at least a part of at least one turn of the thread is altered by changing the length of the fastener and restricting the change to a localized zone transversely of the fastener. Alternatively, the thread may be deformed so that the pitch of its crest differs from the pitch of the crests of the turn adjacent thereto. Due to the manner in which deformation and deviation of pitch occurs, when the new fastener is assembled with a complemental threaded fastener, a jamming action occurs which results in a very strong locking of the fasteners together. The pitch deviated thread or threads springs slightly and thereby is not galled or worn unduly even after repeated reuse so that its reuseable torque remains high.

Inasmuch as the new threaded fasteners embodying the present invention have continuous threads, their size need not exceed that of conventional threaded fasteners of generally the same class to be able to withstand stresses of equal value. Moreover, inasmuch as the new fasteners are formed wholly of metal they are capable of withstanding low or high temperatures without substantial reduction in locking torque.

For a better understanding of the present invention, reference may be had to the accompanying drawings, in which:

FIGURE 1 is a side elevational and partial sectional view of a screw embodying the present invention, and FIGURE 2 is a view in longitudinal section through a modified form of screw embodying the present invention.

The invention is embodied in male threaded fasteners such as the screw 18 shown in FIGURE 1. The screw includes a head 19 on a shank 20 which is provided with a plurality of turns of a continuous thread 21 of uniform pitch. An axially extending recess 22 is drilled in the end of the screw. At any desired place along the length of the recess, a peripheral groove 23 may be milled in the inner wall of the screw to form a weakened zone. When pressure of sufficient magnitude is applied to the ends of the screw, the portion of the screw in the zone of the groove is deformed thereby altering (decreasing) the pitch of at least a part of the turn 21a of the thread thereby rendering the screw self-locking. No increase is observed in the crest diameter of the turn 21a. The groove also imparts a slight axial resiliency to the screw so that it can expand in length, as described above, to avoid galling of the threads and retain a high reusable locking torque. The width of the groove can be varied and may correspond to the width of several threads, all of which will be deformed when the screw is compressed axially. For some purposes, the wall thickness around the recess 22 may be reduced sufficiently that all of the thread turns along the length of the recess are compressed and changed in pitch.

FIGURE 2 illustrates another type of screw and method of changing the pitch of a portion of a turn of the thread or one or more threads of the screw. A typical screw includes a shank 25 of the screw having a continuous thread 26. A stepped bore 27 is drilled or otherwise formed in the end of the screw to provide a shoulder 28 in a zone selected for the production pitch deviated thread turn or turns. A punch 29 is inserted into the bore into engagement with the shoulder 28 and the screw and the punch are subjected to axial compression sufficient to deform the screw axially and change the pitch of the turn or turns 26a of the thread radially outward of the shoulder 28. With this type of thread deformation, a slight increase in the crest diameter of the turn 26a occurs probably due to some outward deflection of the shoulder 28 by the punch.

In the above-described forms of the invention, the threads of the fastening devices are not interrupted and sufficient metal is present in the screw at the zone of pitch deviation and on opposite sides thereof to provide necessary strength characteristics in the fastening devices without increasing the overall size of the fastening device. Also, inasmuch as the fastening device is formed entirely of metal, it is usable at high temperatures.

The continuity of the thread also reduces the tendency of the fastening devices to crystallize or break under pressure and prevents deformation occurring from its reuse and the stresses to which it is subjected during use.

It will be understood that the invention is readily adapted to other types of male fastening devices and to different types of threads than those described herein.

Accordingly, the embodiments of the invention disclosed herein should be considered as illustrative and not as limiting the invention as defined in the following claims.

I claim:
1. A self-locking male fastener comprising a male fastening element, an uninterrupted thread having a plurality of turns on said fastening element, at least one of said turns having an axially compressed zone to provide a pitch different than the pitch of the crests of the turns of the thread adjacent thereto, said fastening element having in one end thereof a first bore and a second bore of smaller diameter, said bores joining to define an axial recess extending from said one end of said fastening element and a substantially right angle shoulder in said recess facing said one end and substantially coplanar with said at least one of said turns in said compressed zone.

2. A method of making a self-locking male threaded fastener comprising forming in one end of said fastener a first bore and a second bore of smaller diameter, said bores joining to define an axially extending stepped recess providing a substantially right angle shoulder facing said one end of said male threaded fastening element having an uninterrupted thread including a plurality of turns on its periphery, applying axial pressure to said shoulder by engaging said shoulder with a tool and simultaneously applying axial pressure to said screw in opposite directions to compress and permanently deform said element axially and change the pitch of at least a portion of at least one turn of the threads adjacent to said shoulder.

References Cited by the Examiner
UNITED STATES PATENTS

| | | |
|---|---|---|
| 609,144 | 8/1898 | Godden. |
| 1,250,748 | 12/1917 | Woodward _____ 151—22 |
| 1,367,168 | 2/1921 | Stanford _____ 151—22 |
| 1,416,087 | 5/1922 | Woodward. |
| 2,090,337 | 8/1937 | Stoll. |
| 2,542,377 | 2/1951 | Turkish _____ 151—22 |
| 3,076,208 | 2/1963 | Moore _____ 151—22 |

EDWARD C. ALLEN, *Primary Examiner.*